US012572620B2

(12) United States Patent
Sobala et al.

(10) Patent No.: US 12,572,620 B2
(45) Date of Patent: Mar. 10, 2026

(54) RELIABLE INFERENCE OF A MACHINE LEARNING MODEL

(71) Applicant: International Business Machines Corporation, Armonk, NY (US)

(72) Inventors: Wojciech Sobala, Cracow (PL);
Lukasz G. Cmielowski, Cracow (PL);
Maksymilian Erazmus, Cracow (PL);
Rafal Bigaj, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 17/353,931

(22) Filed: Jun. 22, 2021

(65) Prior Publication Data

US 2022/0405525 A1     Dec. 22, 2022

(51) Int. Cl.
G06F 18/2113 (2023.01)
G06F 18/214 (2023.01)
(Continued)

(52) U.S. Cl.
CPC ........ G06F 18/2113 (2023.01); G06F 18/214 (2023.01); G06N 20/00 (2019.01); G06V 10/751 (2022.01)

(58) Field of Classification Search
CPC ... G06F 18/2113; G06F 18/214; G06N 20/00; G06V 10/751
See application file for complete search history.

(56) References Cited

U.S. PATENT DOCUMENTS 10,484,399 B1 * 11/2019 Curtin ...................... G06F 17/11
2015/0127595 A1 5/2015 Hawkins, II et al.
(Continued)

FOREIGN PATENT DOCUMENTS

WO     WO-2021087129 A1 * 5/2021     ............. G06N 20/00
WO     2022/268667 A1   12/2022

OTHER PUBLICATIONS

Patel, "Feature Selection using Correlation and Ranking Filter Methods," Apr. 22, 2021, github.com/atulpatelDS/Youtube/blob/main/Feature_Engineering/Feature%20Selection%20using%20Correlation%20and%20Ranking%20Filter%20methods%20-Check%20Multi-collinearity-%20Tutorial%205.ipynb (Year: 2021).*
Tang et al., "A local density-based approach for outlier detection," 2017, http://dx.doi.org/10.1016/j.neucom.2017.02.039 (Year: 2017).*
Kriegel et al., "LoOP: Local Outlier Probabilities," 2009, doi.org/10.1145/1645953.1646195 (Year: 2009).*
(Continued)

*Primary Examiner* — Michael J Huntley
*Assistant Examiner* — Vincent Anton Spraul
(74) *Attorney, Agent, or Firm* — Caleb D. Wilkes

(57) ABSTRACT

A method, system, and computer program product for classifying input data of a machine learning model. The method includes obtaining a dataset. The method also includes determining pairwise correlations of the set of features using their values in the dataset. The method also includes selecting one or more pairs of features that are highly correlated. The method also includes creating a density map that contains a set of points. The method also includes determining a low-density area on the density map having a low-density of points from the density analysis. The method also includes identifying records of the dataset that belong to the determined low-density areas. The method also includes labeling the identified records as low-density and labeling the remaining records of the dataset as high-density. The method also includes training a classifier to classify an input record having the set of features as a low-density or high-density record.

20 Claims, 9 Drawing Sheets

400

Receiving an inference request          401

Inputting the input record to the trained machine learning model for obtaining a prediction from the trained machine learning model          403

Classifying the input record using the classifier          405

Providing the classification result in association with the prediction as an indication of a reliability of the prediction          407

(51) Int. Cl.
    *G06N 20/00*        (2019.01)
    *G06V 10/75*       (2022.01)

(56)           References Cited

U.S. PATENT DOCUMENTS

| | | | |
|---|---|---|---|
| 2015/0262070 A1 | 9/2015 | Aharoni et al. | |
| 2018/0060738 A1 | 3/2018 | Achin et al. | |
| 2019/0122096 A1* | 4/2019 | Husain | G06F 11/3495 |
| 2019/0138946 A1 | 5/2019 | Asher et al. | |
| 2023/0046709 A1* | 2/2023 | Wakasugi | G06N 20/00 |

OTHER PUBLICATIONS

Ling et al., "FDR made easy in differential feature discovery and correlation analyses," 2009, Bioinformatics, vol. 25, Issue 11, Jun. 2009, pp. 1461-1462 (Year: 2009).*

Lee et al., "Parzen Density Estimator for Complex Pattern Classification and High Dimensional Data Analysis," 2018 9th International Conference on Information, Intelligence, Systems and Applications (IISA) (Year: 2018).*

Wikipedia, "Correlation," revision of May 2021 (Year: 2021).*

Wicklin, "Correlations between groups of variables," 2015, "https://blogs.sas.com/content/iml/2015/08/19/corr-between-groups.html" (Year: 2015).*

Eskin et al., "A Geometric Framework for Unsupervised Anomaly Detection: Detecting Intrusions in Unlabeled Data," 2002, Applications of Data Mining in Computer Security (Year: 2002).*

Jiang et al., "To Trust Or Not To Trust A Classifier," 2018, arXiv:1805.11783v2 (Year: 2018).*

Corbiere et al., "Addressing Failure Prediction by Learning Model Confidence," arXiv:1910.04851v2 [cs.CV] Oct. 26, 2019, 11 pages.

"corr.test: Find the correlations, sample sizes, and probability values between elements of a matrix or data.frame.," RDocumentation, Psych (Version 1.8.12), Printed May 14, 2021, 1 page https://www.rdocumentation.org/packages/psych/versions/1.8.12/topics/corr.test.

Mell et al., "The NIST Definition of Cloud Computing," Recommendations of the National Institute of Standards and Technology, U.S. Department of Commerce, Special Publication 800-145, Sep. 2011, 7 pages.

International Searching Authority, "Notification, International Search Report, and Written Opinion of the International Searching Authority," Patent Cooperation Treaty Oct. 11, 2022, 12 pages, International Application No.-PCT/ EP2022/066651.

\* cited by examiner

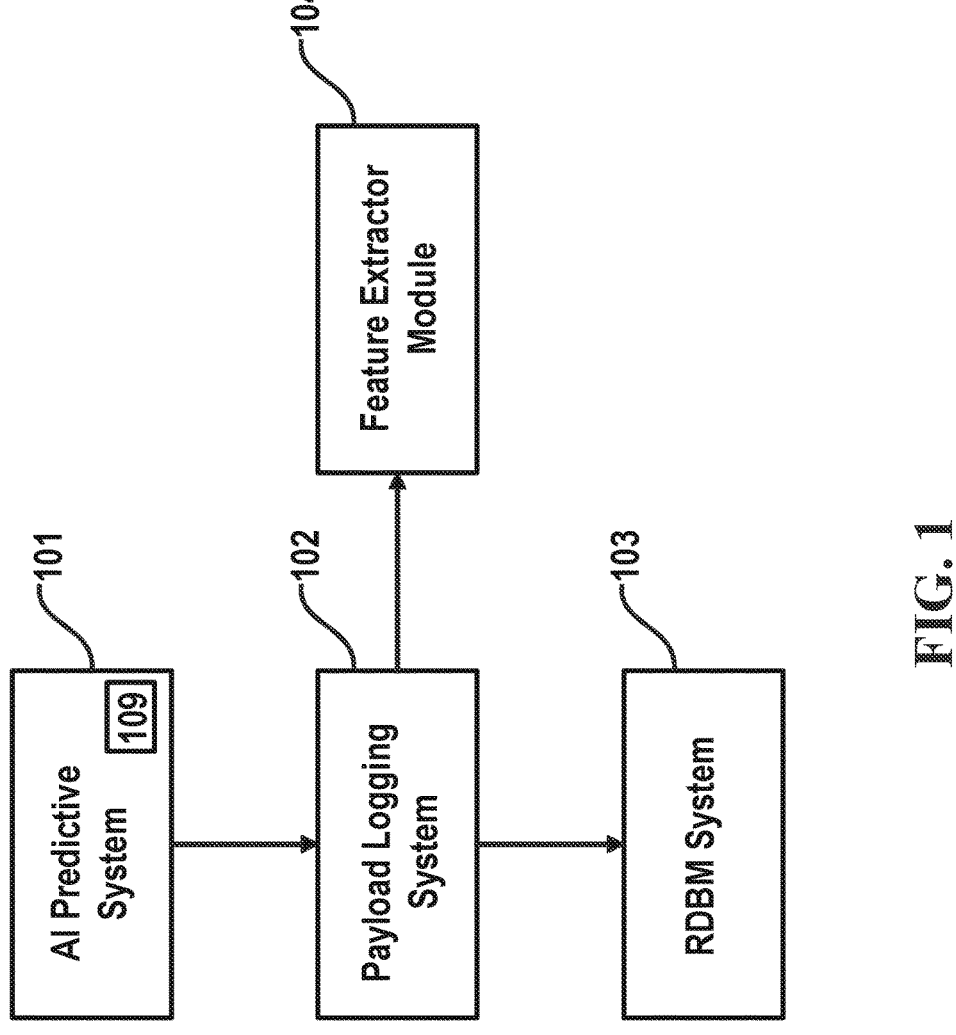
FIG. 1

300

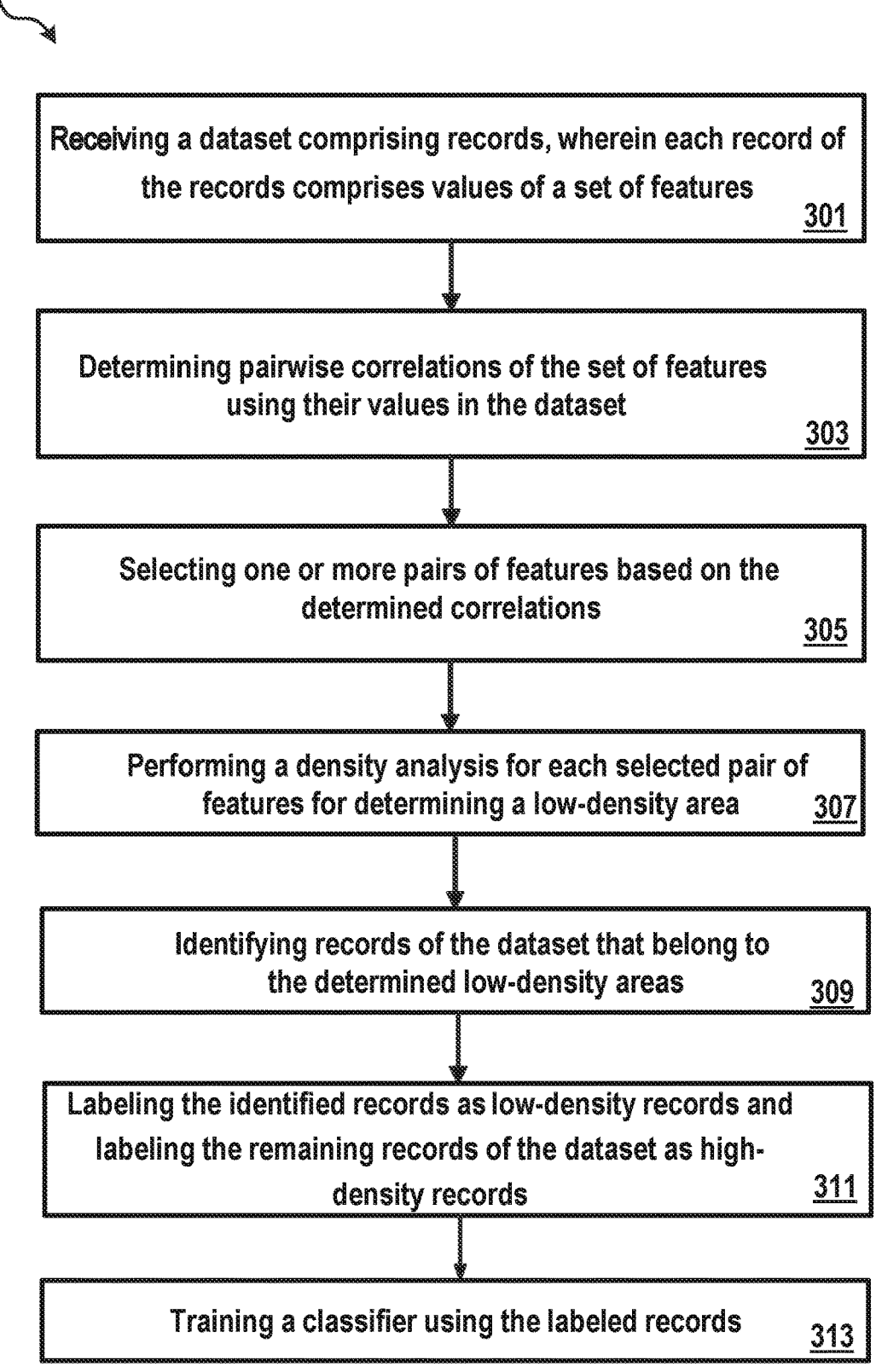

Receiving a dataset comprising records, wherein each record of the records comprises values of a set of features          301

Determining pairwise correlations of the set of features using their values in the dataset          303

Selecting one or more pairs of features based on the determined correlations          305

Performing a density analysis for each selected pair of features for determining a low-density area          307

Identifying records of the dataset that belong to the determined low-density areas          309

Labeling the identified records as low-density records and labeling the remaining records of the dataset as high-density records          311

Training a classifier using the labeled records          313

Receiving an inference request                                                    401

Inputting the input record to the trained machine learning model for
obtaining a prediction from the trained machine learning model        403

Classifying the input record using the classifier                              405

Providing the classification result in association with the prediction
as an indication of a reliability of the prediction                           407

501

Providing a two-dimensional distribution of the values of the pair of features

503

Determining the low-density area and high-density area in the distribution

RELIABLE INFERENCE OF A MACHINE LEARNING MODEL

BACKGROUND

The present disclosure relates to the field of digital computer systems and, more specifically, to classifying input data of a machine learning model.

Machine learning models are being integrated in many software systems such as database transaction processing systems. These models may be very complex to evaluate. For that, the evaluation and monitoring of such models rely on the behaviour of the outcomes as function of the inputs. However, such evaluations may be resource consuming.

SUMMARY

The present invention provides a computer-implemented method, system, and computer program product for classifying input data of a machine learning model. The method includes obtaining a dataset comprising records, where each record comprises values of a set of features. The method also includes determining pairwise correlations of the set of features using their values in the dataset. The method also includes selecting one or more pairs of features that are highly correlated, based on the pairwise correlations. The method also includes creating, using a density analysis for each selected pair of features, a density map that contains a set of points, where each point of the points represents a pair of values of the pair of features. The method also includes determining a low-density area on the density map having a low-density of points from the density analysis. The method also includes identifying records of the dataset that belong to the determined low-density areas. The method also includes labeling the identified records as low-density records and labeling the remaining records of the dataset as high-density records, resulting in labeled records. The method also includes training a classifier, using the labeled records, to classify an input record having the set of features as a low-density or high-density record. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1 is a block diagram of a computer system in accordance with an example of the present subject matter.

FIG. 3 is a flowchart of a method for classifying records in accordance with an example of the present subject matter.

FIG. 6A is a distribution of points for the pair of features.

FIG. 6B illustrates a method for determining a low and high-density areas in the distribution of FIG. 6A.

Figure 2:
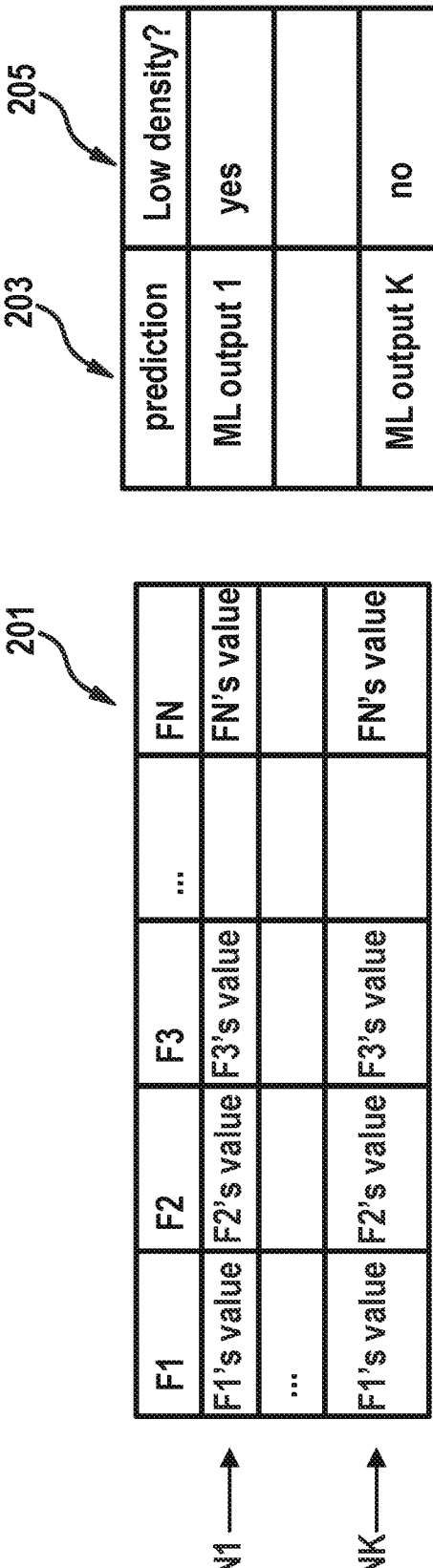
FIG. 2 depicts a representation of a set inputs and outputs of the machine leaning model in accordance with an example of the present subject matter.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In order to trust and reliably act on model predictions, it may be crucial to monitor and evaluate the distribution of incoming requests and corresponding outputs of the machine learning models. For example, the sensitivity of a machine learning model may be evaluated, where the sensitivity describes the severity of a change of the model's output related to the change of a given input value. This may provide an insight in the influence of input variables on outputs. This type of analysis may be used for understanding models' behavior in terms of the change of input values, noise tolerance, data quality, internal structure, etc. In addition, it is common practice to log the inputs and outputs of the machine learning models for these monitoring and evaluation purposes. Such logged data may be a structured scoring payload data which is usually persisted in relational database management (RDBM) systems in form of the structured query language (SQL) tables.

The evaluation process of a machine learning model may thus involve logging of data and then evaluation of the logged data. However, this process may be very resource consuming, particularly for big models with large input sizes. The present subject matter addresses this issue by enabling a reliable evaluation analysis of the machine learning model. For that, the present subject matter may first perform the correlation analysis on the scoring input data. The most strongly correlated features are used to identify low-density areas and a classifier is trained to classify inferred records as being low-density records or high-density records.

According to some embodiments, the method may include: providing a trained machine learning model that is configured to receive an input vector and to provide an output based on the input vector, wherein the input vector comprises values of the set of features. The method may further include: receiving an inference request, the inference request comprises an input record having values of the set of features, inputting the input record to the trained machine learning model for obtaining a prediction from the trained machine learning model, classifying the input record using the classifier, and providing the classification result in association with the prediction as an indication of a reliability of the prediction. In some embodiments, this method may be performed in real-time (e.g., during inference of the trained machine learning model).

According to some embodiments, the method may further include: receiving an inference request. The inference request comprises a set of input records each having values of the set of features. The method may further include inputting the set of input records to the trained machine learning model for obtaining a set of predictions from the trained machine learning model, classifying the set of input records using the classifier, and providing the fraction of low-density records of the set of input records in association with each of the predictions as an indication of a reliability of the prediction. The number or fraction of the low-density records may be used as a metric describing the reliability of the predictions (e.g., the inferred record may be stored with a reliability value LOW if it is a low-density record otherwise with a reliability value HIGH).

These embodiments may be advantageous as they may provide accurate inference results. The users may interpret results better, and thus make accurate technical decisions (e.g., the technical decision may require changing the configuration of a system based on the inference result). Thus, the present subject matter may prevent misconfiguration of systems and may thus prevent waste of processing resources and prevent potential disaster that may be caused by a misconfiguration.

The term "machine learning" refers to a computer algorithm used to extract useful information from training data by building probabilistic models (referred to as machine learning models) in an automated way. The machine learning may be performed using one or more learning algorithms such as linear regression, K-means, classification algorithm, reinforcement algorithm, gradient descent for a deep neural network etc. A "model" may for example be an equation or set of rules that makes it possible to predict an unmeasured value from other known values and/or to predict or select an action to maximize a future reward or minimize a future penalty.

According to some embodiments, the one or more pairs of features are pairs whose correlation is higher than a threshold value. In one example, a false discovery rate (FDR) may be performed to select a subset of the pairs of features based on the correlations. Using FDR may enable to select significant correlations. The threshold value may then be applied on the subset of pairs. Thus, two parameters may be involved, namely the FDR p-value and the threshold value and the pairs of features may be selected based on values of these two parameters. This may be advantageous as it may provide an accurate determination of the most correlated features. The most correlated features may be the features that influence the results of the inference of the machine learning model.

According to some embodiments, the identified records are records that belong to all the low-density areas.

According to some embodiments, the identified records are records that belong to a minimum number of low-density areas. This may enable a controlled classification of the records based on the domain in which the machine learning model is used. For example, for a domain such as a healthcare domain, a very accurate prediction may be needed. In this case the minimum number may be as low as possible to make sure that every record that belonged to any low-density area may be spotted.

According to some embodiments, the minimum number of low-density areas may be one density area.

According to some embodiments, the density analysis is performed using another dataset of records and/or the provided dataset. Using different datasets may prevent bias in the analysis.

According to some embodiments, the performing or creating of the density analysis comprises: determining a distribution of the points in a two-dimensional space defined by the pair of features such that the two-dimensional space defines the area of all the points, and determining the low-density area using the distribution. The distribution may, for example, be a bi-variate distribution density.

Referring now to FIG. 1, a structure of a computer system 100 is depicted, in accordance with an example of the present subject matter. The computer system 100 may comprise an artificial intelligence (AI) predictive system 101, a payload logging system 102, a relational database management (RDBM) system 103, and a feature extractor module 104.

The AI predictive system 101 may comprise at least one trained machine learning (ML) model 109. The trained machine learning model 109 may be configured to receive an input having a set of features and to provide an output or a prediction. As shown in FIG. 2, each input (e.g., input vector) of K inputs $IN_1$, $IN_2$ . . . $IN_K$ of the trained machine learning model 109 may comprise values of a set of N features $F_1$, $F_2$ . . . $F_N$. Each input of the inputs may correspond to a record of a dataset or database, where the set of features are attributes of the record. In machine learning, for instance, features may be variables or characteristics. Each feature may be an input, in some instances. Further, each feature may have a corresponding value (for instance, so that the feature is measurable), which may be referred to herein as a feature value. The inputs $IN_1$, $IN_2$ . . . $IN_K$ may, for example, be organized in an input table 201 as shown in FIG. 2, where each row of the input table 201 represents one input of the trained machine learning model 109 and each column represents the values of a respective feature of the set of features $F_1$, $F_2$ . . . $F_N$. For example, for each input of the inputs $IN_1$, $IN_2$ . . . $IN_K$, the trained machine learning model 109 may be inferred (e.g., using method 400 (FIG. 4)) in order to provide a prediction or output $OUT_1$, $OUT_2$ . . . $OUT_K$. This may result, as shown in FIG. 2, in a vector 203 of outputs (also referred to as predicted output table 203) $OUT_1$, $OUT_2$ . . . $OUT_K$ of the trained machine learning model 109 which are associated with the inputs $IN_1$, $IN_2$ . . . $IN_K$ respectively. Thus, the AI predictive system 101 may be configured to generate using the trained machine learning model 109 a set of prediction values $OUT_1$, $OUT_2$ . . . $OUT_K$ (shown in predicted output table 203) from a set of inputs $IN_1$, $IN_2$ . . . $IN_K$, where each input of the set of inputs includes values of the set of features $F_1$, $F_2$ . . . $F_N$. The present subject matter may enhance the content of the table 201 by adding additional information on the inputs that indicates the reliability of the predictions in the vector 203. For that, the feature extractor module 104 may be used in accordance with the present subject matter (e.g., as described with reference to FIG. 3). This additional information is represented in FIG. 2 with a vector 205 (referred to as a feature vector 205 and/or a feature table 205), wherein the feature vector 205 includes values indicating whether the inputs $IN_1$, $IN_2$ . . . $IN_K$ represent low-density records.

The payload logging system 102 may be configured to log each input and the associated output produced by the trained machine learning model 109 in the RDBM system 103. Following the example of FIG. 2, the payload logging system 102 may store the table 201 and the vectors 203 and 205 in the RDBM system 103.

In one example, the computer system 100 may be provided in a cloud environment. For instance, the computer system 100 may be enabled by a cloud infrastructure of cloud-based servers, storage, and network resources accessible through a cloud virtualization technology.

FIG. 3 is a flowchart of a method 300 for classifying records in accordance with an example of the present subject matter. For the purpose of explanation, the method 300 described in FIG. 3 may be implemented in the system illustrated in FIG. 1 but is not limited to this implementation. The method of FIG. 3 may, for example, be implemented by the feature extractor module 104.

A dataset may be received or obtained in step 301. The dataset may include a set of records, where each record of the set of records includes values of the set of features (e.g., each feature of the set of features may be an attribute of the record). In some embodiments, the dataset may be converted into a set of inputs and/or input values. Each record may, for example, be provided as one of the inputs $IN_1$, $IN_2$ ... $IN_K$. For example, the set of records of the dataset may be the inputs $IN_1$, $IN_2$ ... $IN_K$.

Pairwise correlations of the set of features may be determined in step 303 using their values in the dataset. A pairwise correlation may be a correlation between data (e.g., features) that are not missing any values. The pairwise correlation may only use data with non-missing values and may not consider any data with missing values, in some instances. The pairwise correlations of the set of features $F_1$, $F_2$ ... $F_N$ may be performed in step 303 using their values in the set of records $IN_1$, $IN_2$ ... $IN_K$. That is, a pairwise correlation may be performed between the columns of the table 201. In some instances, the pairwise correlation may show the relationship and/or connections between the columns. For example, the correlation between the features $F_1$ and $F_2$ may be performed by determining a correlation between the vectors of K values defined by the first column and the second column of the table 201. This step may, for example, be performed using the python function corr( ).

One or more pairs of features may be selected in step 305 based on the determined correlations. In some instances, these pairs may be highly correlated pairs. For example, the pair of features associated with the correlation higher than a predefined threshold value may be selected. In another example, high correlations may be found using false discovery rate (FDR) statistical procedure and next filtered out using the threshold for an absolute value of correlation. For example, J pairs of features may be selected in step 305, where $J \geq 1$.

Figure 4:
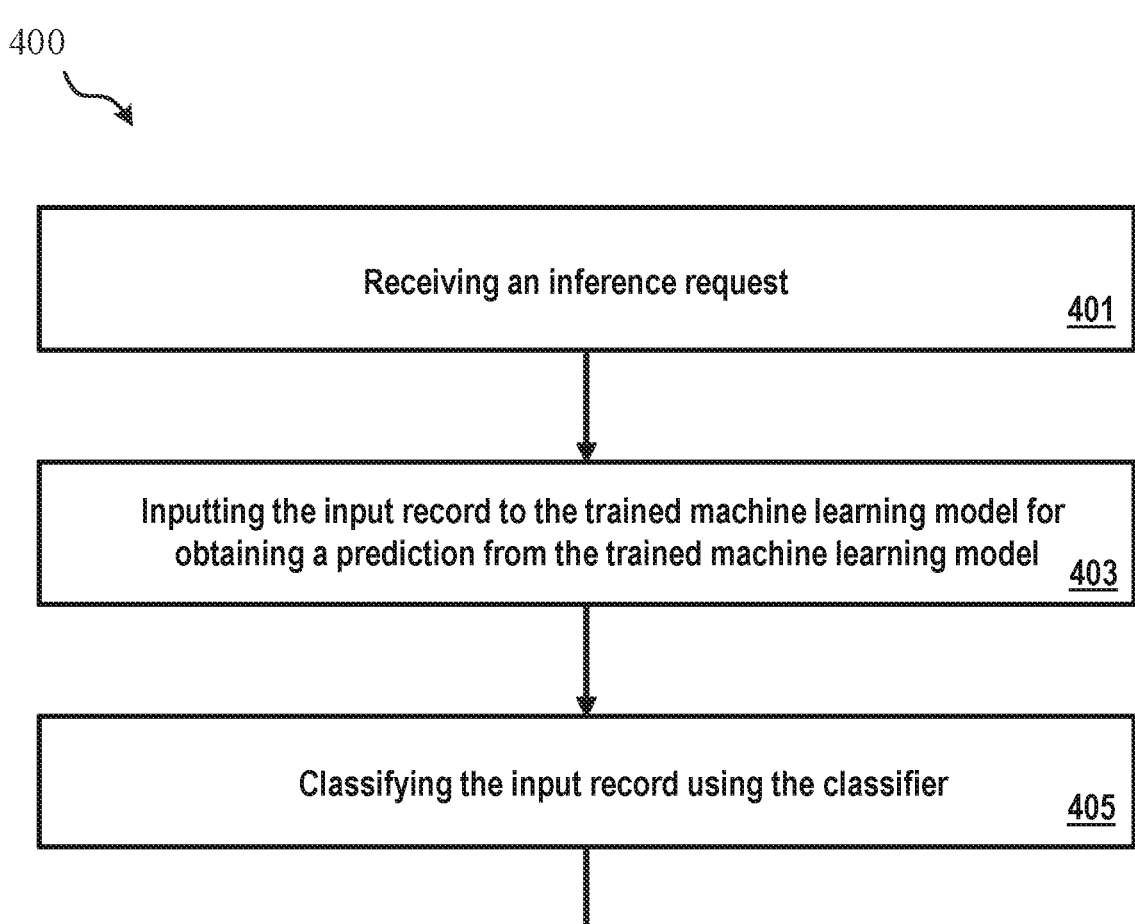
FIG. 4 is a flowchart of a method for inferring a trained machine learning model in accordance with an example of the present subject matter.

A density analysis may be performed or created in step 307 for each selected pair of features for determining a low-density area having a low-density of points and a high-density area having a high-density of the points. In some embodiments, there is a predetermined density threshold for the low-density area and high-density area. Each point of the points represents a pair of values of the pair of features. The low-density area comprises points that have a low-density in an area defined by all points of the selected pair of features. Put differently, the low-density area is the area, when looking at all the points, that has a low density of points. This is discussed further in FIGS. 5, 6A, and 6B. The points that do not belong to the low-density area may be considered as points of a high-density area. FIG. 4 provides an example of the density analysis (discussed further herein). Step 307 may result in J low-density areas associated with the J selected pairs of features. The density analysis is further discussed herein and depicted in FIGS. 5, 6A, and 6B.

The density analysis may be performed on the same dataset received in step 301 and/or on another dataset of records that have values of the set of features (i.e., feature values). This may be advantageous as the most correlated features may be determined using one dataset and the density may be determined using another dataset and thus may prevent a potential bias in the analysis.

Records of the dataset that belong to the determined low-density areas may be identified in step 309. Records may be information corresponding to the data (for example, input values, features, etc.). Low-density areas may be identified using pairs of features. Therefore, records of the dataset that belong to the determined low-density areas may be records and/or information about (for example, corresponding to) to the pairs of features that correspond to data points the low-density areas. For example, each record of the identified records may belong to all the J low-density areas. In another example, it may be sufficient to identify a record if it belongs to at least one of the J low-density areas.

The identified records may be labeled in step 311 as low-density records and the remaining records of the dataset may be labeled as high-density records. This may improve the use of the received dataset as a training set by labeling its records in step 311.

A classifier may be trained in step 313 using the labeled records so that the classifier is configured to classify an input record having the set of features as a low-density record or high-density record. The classifier may, for example, be a binary classifier. The classifier may, for example, be a neural network.

FIG. 4 is a flowchart of a method 400 for inferring a trained machine learning model, in accordance with an example of the present subject matter. For the purpose of explanation, the method described in FIG. 4 may be implemented in the system illustrated in FIG. 1 but is not limited to this implementation. The method of FIG. 4 may, for example, be implemented by the AI predictive system 101. The AI predictive system 101 may, for example, perform the method of FIG. 4 in real-time.

An inference request of the trained machine learning model 109 may be received in step 401. In machine learning, for example, an inference may be the process of running data points (for example, inputs of the values of the sets of features) through the machine learning model. Therefore, an inference request may be a request for an inference, or a request to run data points through the machine learning model. The inference request may include an input record having values of the set of features. The values of the set of features may be inputted into the machine learning model during the inference, for instance.

The input record may be provided as input in step 403 to the trained machine learning model 109 for obtaining a prediction from the trained machine learning model.

The input record may be classified in step 405 using the classifier (e.g., as obtained by the method of FIG. 3).

The classification result may be provided in step 407 in association with the prediction as an indication of a reliability of the prediction. The number or fraction of the low-density records may be used as a metric describing the reliability of the predictions (e.g., the inferred record may be stored with a reliability value LOW if it is a low-density record otherwise with a reliability value HIGH). For instance, if the input record and/or input values are low-density, then they may not be following the trends of the other values and/or records, as there are not many other data points nearby. This may indicate that the input record and/or input values are more of an outlier and are not very reliable.

Figure 5:
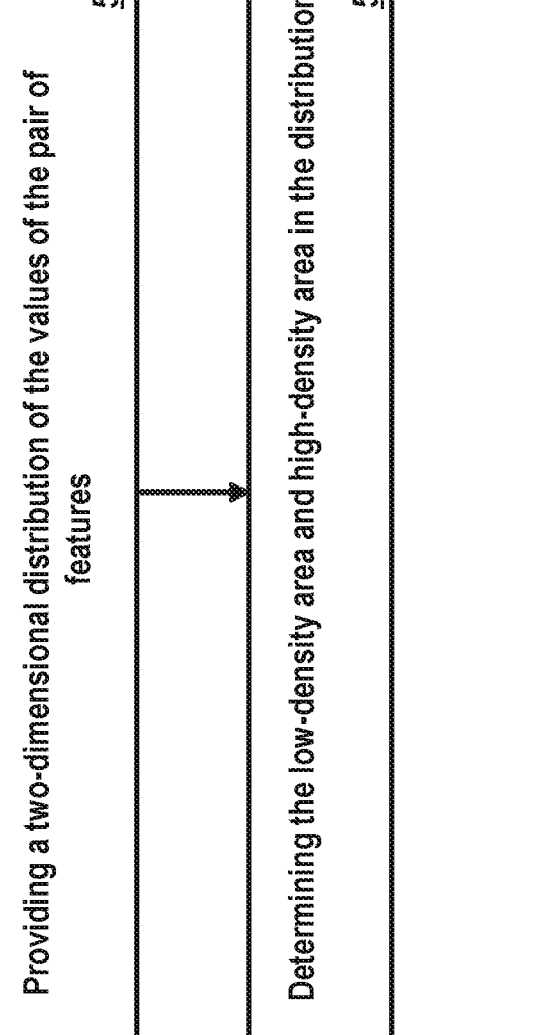
FIG. 5 is a flowchart of a method for performing a density analysis for a pair of features in accordance with an example of the present subject matter.

FIG. 5 is a flowchart of a method 500 for performing a density analysis for a pair of features ($F_A$, $F_B$) in accordance with an example of the present subject matter. The method of FIG. 5 may, for example, be implemented by the feature extractor module 104.

Figures 6A, 6B:
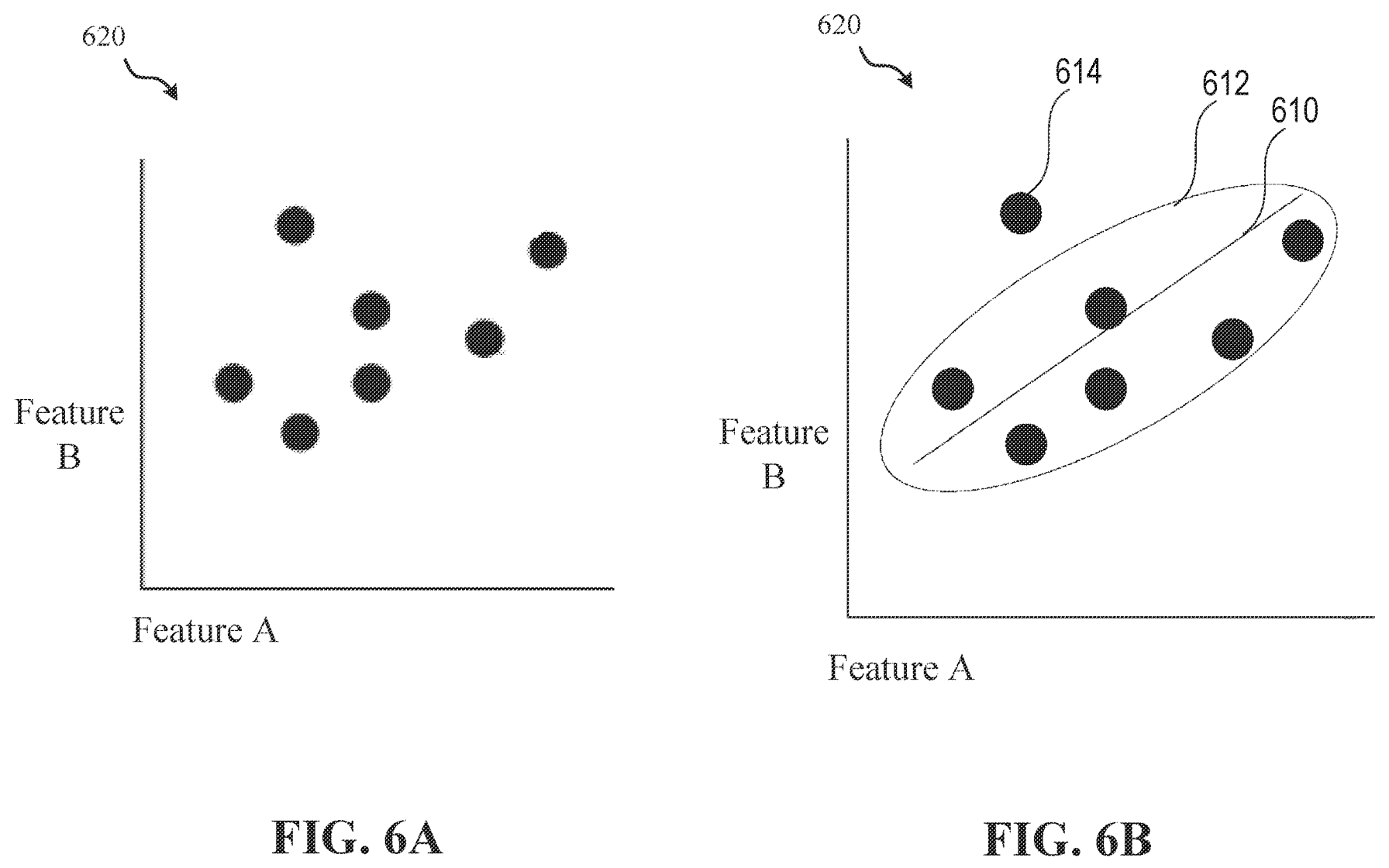

A two-dimensional distribution 620 of the values of the pair of features ($F_A$, $F_B$) may be provided as a bi-variate distribution density (e.g., scatter plot) in step 501, as shown in FIG. 6A, for example. Each pair of values may be provided as a single point. Following the example of table 201, the two-dimensional distribution 620 may comprise K points, because the length of the vector of values of each feature $F_A$ and $F_B$ is K in the dataset. For example, a rectangle may be determined using the minimum and maximum values of the pair of features ($F_A$, $F_B$). That is, the rectangle may have the four corners defined by the following values of the pair ($F_A$, $F_B$): (min ($F_A$), min ($F_B$)), (min ($F_A$), max ($F_B$)), (max ($F_A$), min ($F_B$)) and (max ($F_A$), max ($F_B$)).

A low-density area may be defined or determined in the distribution in step 503. The low-density area may, for example, be defined by a user based on the distribution. In one example, a threshold may be calculated to identify low-density points as points with a density area smaller than the threshold. In some embodiments, the threshold value may be selected such that at most 1% of records in the dataset have the density value below the threshold. For example, a cutting line may be defined in the rectangle according to a quantile 1% so that 1% of points are under the cutting line. In some embodiments, the threshold value may be selected such that at most 1% of records in the dataset have the density value above the threshold. For example, in two-dimensional distribution 620, a cutting line 610 may be defined according to a quantile 1% so that 1% of points are above the cutting line 610. In some embodiments, the area below the cutting line is calculated and it is the high-density area as shown in FIG. 6B with an ellipsis area 612. The low-density area may be, in some instances, only one point 614. The cutting line value may be an arbitrary value. For example, the cutting line may be defined to be 1% quantile of the bivariate distribution, with the cutting line capturing 1% of the most extreme records/points. This may mean that the integral of density above a cutting plane should be 0.99. In some embodiments, the records for the low-density area may be the records or information relating to the data points within the low-density area (and their corresponding features). The records for the high-density area may be the records or information relating to the data points within the high-density area.

Figure 7:
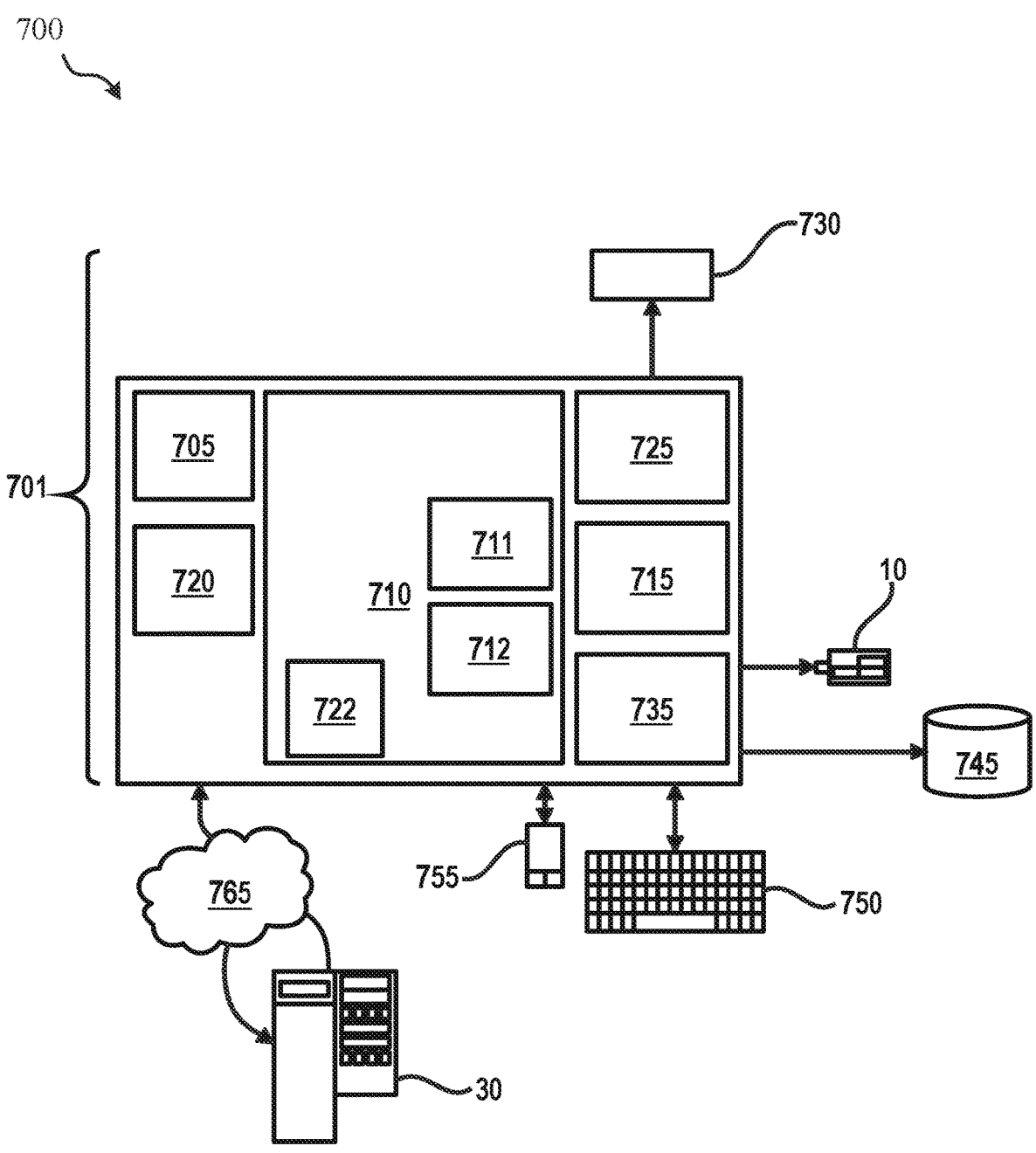
FIG. 7 represents a computerized system, suited for implementing one or more method steps as involved in the present subject matter.

FIG. 7 represents a general computerized system 700 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 711, 712, hardware (processor) 705, or a combination thereof. In exemplary embodiments, the methods described herein are implemented in software, as an executable program, and is executed by a special or general-purpose digital computer, such as a personal computer, workstation, minicomputer, or mainframe computer. The most general system 700 may therefore include a general-purpose computer 701.

In exemplary embodiments, in terms of hardware architecture, as shown in FIG. 7, the computer 701 includes a processor 705, memory (main memory) 710 coupled to a memory controller 715, and one or more input and/or output (I/O) devices (or peripherals) 10, 745 that are communicatively coupled via a local input/output controller 735. The input/output controller 735 can be, but is not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 745 may generally include any generalized cryptographic card or smart card known in the art.

The processor 705 is a hardware device for executing software, particularly that stored in memory 710. The processor 705 can be any custom made or commercially available processor, a central processing unit (CPU), an auxiliary processor among several processors associated with the computer 701, a semiconductor-based microprocessor (in the form of a microchip or chip set), or generally any device for executing software instructions.

The memory 710 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 710 can have a distributed architecture, where various components are situated remote from one another, but can be accessed by the processor 705.

The software in memory 710 may include one or more separate programs, each of which comprises an ordered listing of executable instructions for implementing logical functions, notably functions involved in embodiments of this invention. In the example of FIG. 7, software in the memory 710 includes instructions 712 (e.g., instructions to manage databases such as a database management system).

The software in memory 710 shall also typically include a suitable operating system (OS) 411. The OS 711 essentially controls the execution of other computer programs, such as instructions 712 for implementing methods as described herein.

The methods described herein may be in the form of a source program 712, executable program 712 (object code), script, or any other entity comprising a set of instructions 712 to be performed. When a source program, then the program needs to be translated via a compiler, assembler, interpreter, or the like, which may or may not be included within the memory 710, so as to operate properly in connection with the OS 711. Furthermore, the methods can be written as an object-oriented programming language, which has classes of data and methods, or a procedure programming language, which has routines, subroutines, and/or functions.

In exemplary embodiments, a conventional keyboard 750 and mouse 755 can be coupled to the input/output controller 735. Other output devices such as the I/O devices 745 may include input devices, for example but not limited to a printer, a scanner, microphone, and the like. Finally, the I/O devices 10, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 745 can be any generalized cryptographic card or smart card known in the art. The system 700 can further include a display controller 725 coupled to a display 730. In exemplary embodiments, the system 700 can further include a network interface for coupling to a network 765. The network 765 can be an IP-based network for communication between the computer 701 and any external server, client and the like via a broadband connection. The network 765 transmits and receives data between the computer 701 and external systems 30, which can be involved to perform part, or all of the steps of the methods discussed herein. In exemplary embodiments, network 765 can be a managed IP network administered by a service provider. The network 765 may be implemented in a wireless fashion, (e.g., using wireless protocols and technologies, such as Wi-Fi, WiMax, etc.). The network 765 can also be a packet-switched network such as a local area network, wide area network, metropolitan area network, Internet network, or other similar type of network environment. The network 765 may be a fixed wireless network, a wireless local area network (WLAN), a wireless wide area network (WWAN) a personal area network (PAN), a virtual private network (VPN), intranet or other suitable network system and includes equipment for receiving and transmitting signals.

If the computer 701 is a PC, workstation, intelligent device or the like, the software in the memory 710 may further include a basic input output system (BIOS) 722. The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to execute software 712 stored within the memory 710, to communicate data to and from the memory 710, and to generally control operations of the computer 701 pursuant to the software. The methods described herein and the OS 711, in whole or in part, but typically the latter, are read by the processor 705, possibly buffered within the processor 705, and then executed.

When the systems and methods described herein are implemented in software 712, as is shown in FIG. 7, the methods can be stored on any computer readable medium, such as storage 720, for use by or in connection with any computer related system or method. The storage 720 may comprise a disk storage such as HDD storage.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
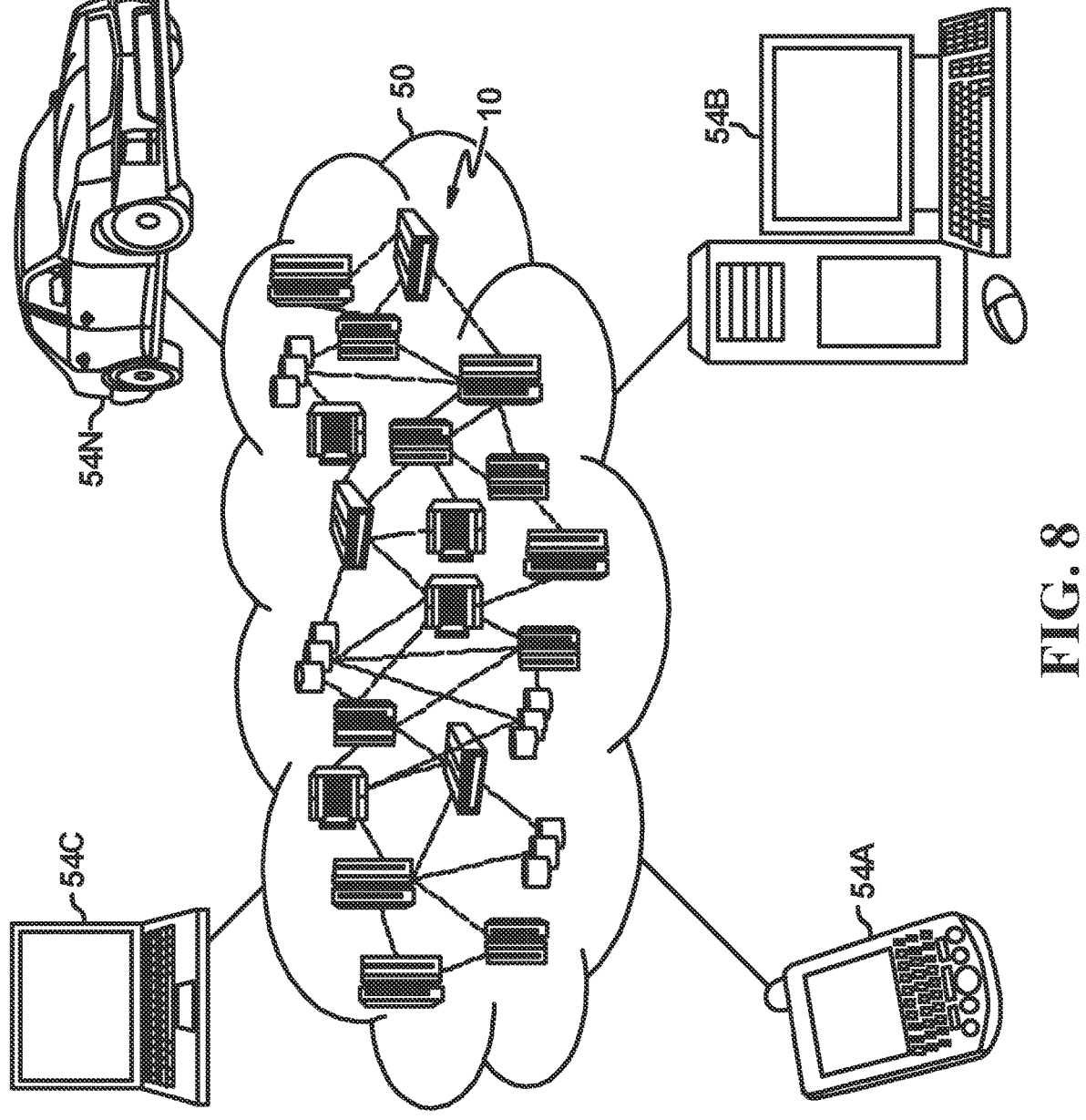
FIG. 8 depicts a cloud computing environment according to an embodiment of the present invention.

Referring now to FIG. 8, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
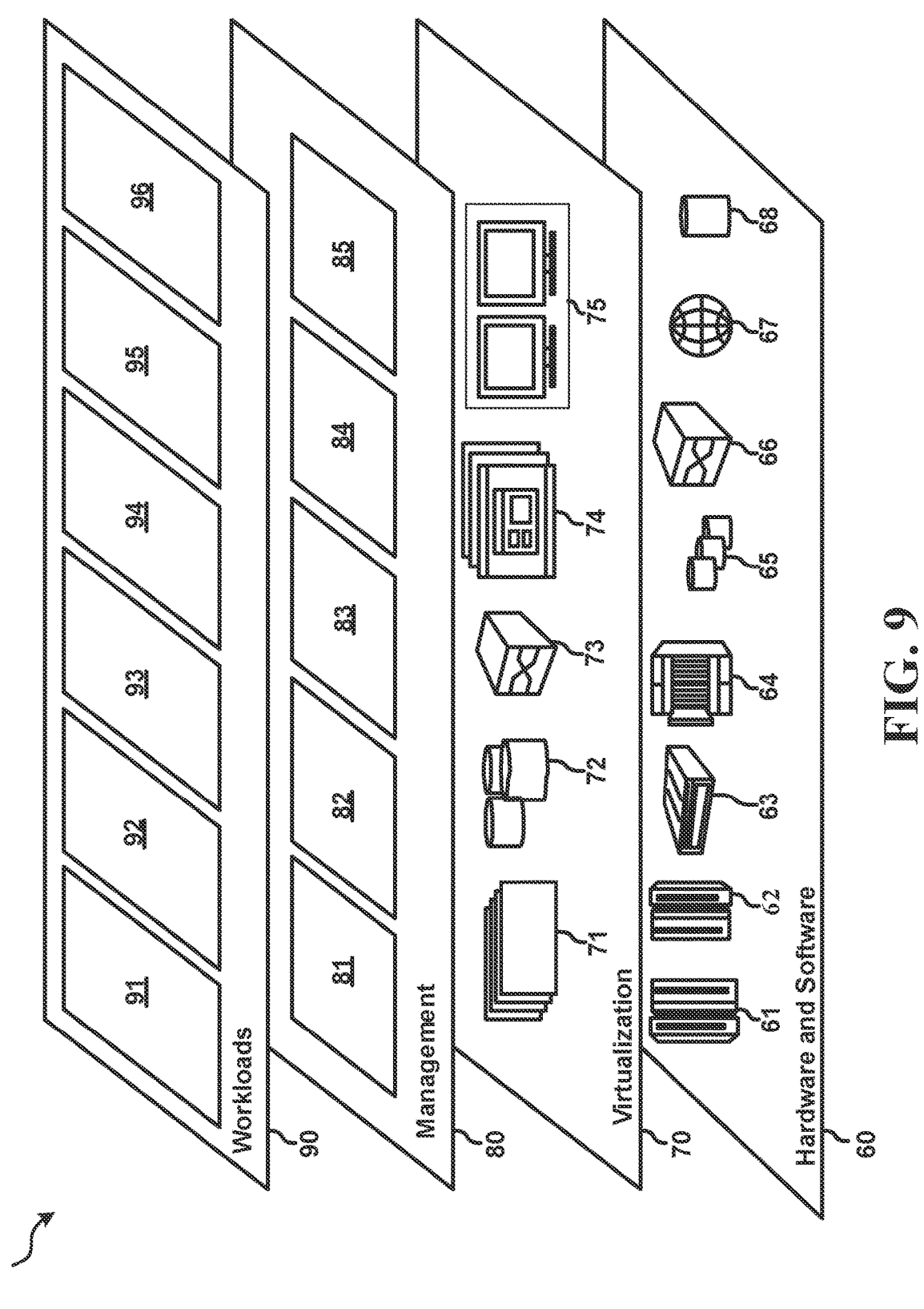
FIG. 9 depicts abstraction model layers according to an embodiment of the present invention.

Referring now to FIG. 9, a set of functional abstraction layers 900 provided by cloud computing environment 50 (FIG. 8) is shown, according to some embodiments. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reliable inference of a machine learning model (RIML) 96.

The present subject matter may comprise the following clauses.

Clause 1. A computer implemented method comprising:

providing a dataset comprising records, wherein each record of the records comprises values of a set of features;

determining pairwise correlations of the set of features using their values in the dataset;

selecting one or more pairs of features based on the determined correlations;

performing a density analysis for each selected pair of features for determining a low density area having points, wherein each point of the points represents a pair of values of the pair of features; wherein the low density area comprises points that have a low density in an area defined by all points of the selected pairs of features;

identifying records of the dataset that belong to the determined low density areas;

labeling the identified records as low density records and labeling the remaining records of the dataset as high density records;

training a classifier using the labeled records so that the classifier is configured to classify an input record having the set of features as a low density or high density record.

Clause 2. The method of clause 1, further comprising: providing a trained machine learning model that is configured to receive an input vector and to provide an output based on the input vector, wherein the input vector comprises values of the set of features, receiving an inference request, the inference request comprising an input record having values of the set of features; inputting the input record to the trained machine learning model for obtaining a prediction from the trained machine learning model; classifying the input record using the classifier; and providing the classification result in association with the prediction as an indication of a reliability of the prediction.

Clause 3. The method of clause 1, further comprising providing a trained machine learning model that is configured to receive an input vector and to provide an output based on the input vector, wherein the input vector comprises values of the set of features, receiving an inference request, the inference request comprising a set of input records each having values of the set of features, inputting the set of input records to the trained machine learning model for obtaining a set of predictions from the trained machine learning model, classifying the set of input records using the classifier, and providing the fraction of low density records of the set input of input records in association with the prediction as an indication of a reliability of the prediction.

Clause 4. The method of any of the preceding clauses 1 to 3, wherein the one or more pairs of features are pairs whose correlation is higher than a threshold value.

Clause 5. The method of any of the preceding clauses 1 to 4, wherein the identified records are records that belong to all the low density areas.

Clause 6. The method of any of the preceding clauses 1 to 3, wherein the identified records are records that belong to a minimum number of low density areas.

Clause 7. The method of clause 6, the minimum number of low density areas being one.

Clause 8. The method of any of the preceding clauses 1 to 7, wherein the density analysis is performed using another dataset of records and/or the provided dataset.

Clause 9. The method of any of the preceding clauses 1 to 8, wherein the density analysis is a bivariate data analysis.

Clause 10. The method of any of the preceding clauses 1 to 9, the performing of the density analysis comprising: determining a distribution of the points in a two-dimensional space defined by the pair of features such that the two-dimensional space defines the area of all the points, and determining the low density area using the distribution.

Clause 11. The method of any of the preceding clauses 2 to 10, being performed in real-time.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a set of records, wherein each of the records comprises values of a set of features;
for the records, determining pairwise correlations between groups of the values, resulting in highly correlated pairs, wherein the determining of the highly correlated pairs is based on a false discovery rate and a threshold value;
performing density analysis, based on a bi-variate distribution density, for each pair of features of the highly correlated pairs, resulting in a density map that contains a set of high density points separated from a set of low density points, wherein a first subset of the records is associated with the low density points;
labeling the first subset of records as low-density records and labeling remaining records of the set of records as high-density records, resulting in labeled records;
training a classifier, using the labeled records, to classify an input record having the set of features as a low-density or high-density record;
inputting into a machine learning model an inference request comprising a new input record having new values of the set of features such that, in response, the machine learning model produces a prediction; and
inputting the new input record into the trained classifier such that, in response, the trained classifier provides a classification result as an indication of a reliability of the prediction from the machine learning model, wherein the trained classifier is separate from the machine learning model.

2. The method of claim 1, wherein the classification is performed in real-time.

3. The method of claim 1, wherein a low-density area of the density map comprises points that are in an area with a low-density of points, wherein the area is defined by all points of the pairs of features of the highly correlated pairs.

4. The method of claim 1, wherein the first subset of records are records that belong to all low-density areas of the density map.

5. The method of claim 1, wherein the first subset of records are records that belong to a minimum number of low-density areas of the density map.

6. The method of claim 5, wherein the minimum number of low-density areas is one low-density area.

7. The method of claim 1, wherein the density analysis is performed using another dataset of records and the set of records.

8. The method of claim 1, wherein performing of the density analysis comprises:
determining a distribution of the points in a two-dimensional space defined by the pair of features such that the two-dimensional space defines an area that includes all the points; and
determining a low-density area of the density map using the distribution.

9. The method of claim 1, wherein the classification result further comprises a metric based on a fraction of the new values of the new input record that are in a low-density area of the density map, wherein the metric being high is associated with the reliability of the prediction of the machine learning model being correspondingly low.

10. The method of claim 1, wherein the density analysis comprises using minimum and maximum values of the pairs of features to form a rectangle, defining a cutting line in the rectangle based on a predetermined percentage of points in the rectangle, and identifying either points above or points below the cutting line as being the low density points.

11. A system comprising:
one or more computer processors;
a computer-readable storage medium; and
program instructions stored on the computer-readable storage medium to be executed by the one or more computer processors to:
receive a set of records, wherein each of the records comprises values of a set of features;
for the records, determine pairwise correlations between groups of the values, resulting in highly correlated pairs, wherein the determining of the highly correlated pairs is based on a false discovery rate and a threshold value;
perform density analysis, based on a bi-variate distribution density, for each pair of features of the highly correlated pairs, resulting in a density map that contains a set of high density points separated from a set of low density points, wherein a first subset of the records is associated with the low density points;
label the first subset of records as low-density records and label remaining records of the set of records as high-density records, resulting in labeled records;
train a classifier, using the labeled records, to classify an input record having the set of features as a low-density or high-density record;
input into a machine learning model an inference request comprising a new input record having new values of the set of features such that, in response, the machine learning model produces a prediction; and
input the new input record into the trained classifier such that, in response, the trained classifier provides a classification result as an indication of a reliability of the prediction from the machine learning model, wherein the trained classifier is separate from the machine learning model.

12. The system of claim 11, wherein a low-density area of the density map comprises points that are in an area with a low-density of points, wherein the area is defined by all points of the pairs of features of the highly correlated pairs.

13. The system of claim 11, wherein the first subset of records are records that belong to a minimum number of low-density areas.

14. The system of claim 11, wherein the classification result further comprises a metric based on a fraction of the new values of the new input record that are in a low-density area of the density map, wherein the metric being high is associated with the reliability of the prediction of the machine learning model being correspondingly low.

15. A computer program product comprising a computer readable storage medium having program instructions embodied therewith, the program instructions executable by a server to cause the server to perform operations comprising:

receiving a set of records, wherein each of the records comprises values of a set of features;

for each of the records, determining pairwise correlations between groups of the values, resulting in highly correlated pairs, wherein the determining of the highly correlated pairs is based on a false discovery rate and a threshold value;

performing density analysis, based on a bi-variate distribution density, for each pair of features of the highly correlated pairs, resulting in a density map that contains a set of high density points separated from a set of low density points, wherein a first subset of the records is associated with the low density points;

labeling the first subset of records as low-density records and labeling remaining records of the of the set of records as high-density records, resulting in labeled records;

training a classifier, using the labeled records, to classify an input record having the set of features as a low-density or high-density record;

inputting into a machine learning model an inference request comprising a new input record having new values of the set of features such that, in response, the machine learning model produces a prediction; and inputting the new input record into the trained classifier such that, in response, the trained classifier provides a classification result as an indication of a reliability of the prediction from the machine learning model, wherein the trained classifier is separate from the machine learning model.

16. The computer program product of claim 15, wherein the classification result further comprises a metric based on a fraction of the new values of the new input record that are in a low-density area of the density map, wherein the metric being high is associated with the reliability of the prediction of the machine learning model being correspondingly low.

17. The computer program product of claim 15, wherein the density analysis comprises using minimum and maximum values of the pairs of features to form a rectangle, defining a cutting line in the rectangle based on a predetermined percentage of points in the rectangle, and identifying either points above or points below the cutting line as being the low density points.

18. The computer program product of claim 15, wherein a low-density area of the density map comprises points that are in an area with a low-density of points, the area defined by all points of the pairs of features of the highly correlated pairs.

19. The computer program product of claim 15, wherein the first subset of records are records that belong to all low-density areas of the density map.

20. The computer program product of claim 15, wherein the first subset of records are records that belong to a minimum number of low-density areas of the density map.

\* \* \* \* \*